United States Patent
Komada et al.

(10) Patent No.: US 7,989,121 B2
(45) Date of Patent: Aug. 2, 2011

(54) SOLID OXIDE FUEL CELL AND SEPARATOR

(75) Inventors: Norikazu Komada, Naka-gun (JP); Koji Hoshino, Naka-gun (JP); Jun Akikusa, Naka-gun (JP); Kei Hosoi, Naka-gun (JP)

(73) Assignees: Mitsubishi Materials Corporation, Tokyo (JP); The Kansai Electric Power Co., Inc., Osaka (JP)

( * ) Notice: Subject to any disclaimer, the term of this patent is extended or adjusted under 35 U.S.C. 154(b) by 224 days.

(21) Appl. No.: 12/379,804

(22) Filed: Mar. 2, 2009

(65) Prior Publication Data

US 2009/0169970 A1    Jul. 2, 2009

Related U.S. Application Data

(62) Division of application No. 11/634,143, filed on Dec. 6, 2006, now Pat. No. 7,517,605, which is a division of application No. 10/506,526, filed on Sep. 3, 2004, now Pat. No. 7,201,991.

(30) Foreign Application Priority Data

| Mar. 4, 2002 | (JP) | 2002-057057 |
|---|---|---|
| Mar. 4, 2002 | (JP) | 2002-057060 |
| Feb. 26, 2003 | (JP) | 2003-049581 |
| Feb. 26, 2003 | (JP) | 2003-049582 |

(51) Int. Cl.
    *H01M 4/64* (2006.01)
(52) U.S. Cl. ......... 429/519; 429/518
(58) Field of Classification Search .......... None
    See application file for complete search history.

(56) References Cited

U.S. PATENT DOCUMENTS

| 4,366,211 | A | * | 12/1982 | Pollack | 429/451 |
|---|---|---|---|---|---|
| 5,482,792 | A | * | 1/1996 | Faita et al. | 429/437 |
| 5,578,388 | A | | 11/1996 | Faita et al. | |
| 5,691,075 | A | | 11/1997 | Batawi | |
| 6,593,020 | B1 | * | 7/2003 | Yoo et al. | 429/496 |
| 2002/0172849 | A1 | | 11/2002 | Fan et al. | |

FOREIGN PATENT DOCUMENTS

| JP | 2-129857 | 5/1990 |
|---|---|---|
| JP | 3-225767 | 10/1991 |
| JP | 4-63562 | 5/1992 |
| JP | 5-166523 | 7/1993 |
| JP | 7-45289 | 2/1995 |
| JP | 7-153469 | 6/1995 |
| JP | 2001-307754 | 11/2001 |
| JP | 2002-8682 | 1/2002 |

* cited by examiner

*Primary Examiner* — Cynthia Lee
(74) *Attorney, Agent, or Firm* — Wenderoth, Lind & Ponack, L.L.P.

(57) ABSTRACT

A solid oxide fuel cell is formed by arranging a fuel electrode layer and an air electrode layer on both surfaces of a solid electrolyte, respectively, a fuel electrode current collector and an air electrode current collector outside the fuel electrode layer and the air electrode layer, respectively, and separators outside the fuel electrode current collector and the air electrode current collector. A fuel gas and an oxidant gas are supplied from the separators to the fuel electrode layers and the oxidant electrode layers, respectively, through the fuel electrode current collectors and the air electrode current collectors, respectively. Alternatively, indents are provided on the surface of each of the separators, which surface is in contact with one of the current collectors, to increase the dwell volume and hence the retaining time of the gas in the interior of the current collectors.

10 Claims, 5 Drawing Sheets

SOLID OXIDE FUEL CELL AND SEPARATOR

This application is a divisional of U.S. application Ser. No. 11/634,143, filed Dec. 6, 2006, now U.S. Pat. No. 7,517,605 which is a divisional of U.S. application Ser. No. 10/506,526, filed Sep. 3, 2004 (now U.S. Pat. No. 7,201,991).

TECHNICAL FIELD

The present invention relates to a solid oxide fuel cell, more specifically to a separator in a planar solid oxide fuel cell in which the introduced gas is supplied to the whole area of a current collector to thereby equalize the imbalance in the electrode reaction, and the improvement of the electric power generation efficiency is achieved.

BACKGROUND ART

The development of a solid oxide fuel cell, having a laminate structure in which a solid electrolyte layer made of an oxide ion conductor is sandwiched between an air electrode layer (oxidant electrode layer) and a fuel electrode layer, is progressing as a third-generation fuel cell for use in electric power generation. In a solid oxide fuel cell, oxygen (air) is supplied to the air electrode section and a fuel gas ($H_2$, CO and the like) is supplied to the fuel electrode section. The air electrode and the fuel electrode are both made to be porous so that the gases can reach the interfaces in contact with the solid electrolyte layer.

The oxygen supplied to the air electrode section passes through the pores in the air electrode layer and reaches the neighborhood of the interface in contact with the solid electrolyte layer, and in that portion, the oxygen receives electrons from the air electrode to be ionized into oxide ions ($O^{2-}$). The generated oxide ions move in the solid electrolyte layer by diffusion toward the fuel electrode. The oxide ions having reached the neighborhood of the interface in contact with the fuel electrode react with the fuel gas in that portion to produce reaction products ($H_2O$, $CO_2$ and the like), and release electrons to the fuel electrode.

The electrode reaction when hydrogen is used as fuel is as follows:

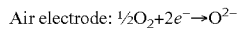

Air electrode: $\frac{1}{2}O_2 + 2e^- \rightarrow O^{2-}$

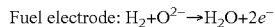

Fuel electrode: $H_2 + O^{2-} \rightarrow H_2O + 2e^-$

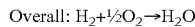

Overall: $H_2 + \frac{1}{2}O_2 \rightarrow H_2O$

Because the solid electrolyte layer is the medium for migration of the oxide ions and also functions as a partition wall for preventing the direct contact of the fuel gas with air, the solid electrolyte layer has a dense structure capable of blocking gas permeation. It is required that the solid electrolyte layer has high oxide ion conductivity, and is chemically stable and strong against thermal shock under the conditions involving the oxidative atmosphere in the air electrode section and the reductive atmosphere in the fuel electrode section. As a material which can meet such requirements, generally a stabilized zirconia (YSZ) that has added yttria is used.

On the other hand, the air electrode (cathode) layer and fuel electrode (anode) layer need to be formed of materials having high electronic conductivity. Because the air electrode material is required to be chemically stable in the oxidative atmosphere of high temperatures around 700° C., metals are unsuitable for the air electrode, and generally used are perovskite type oxide materials having electronic conductivity, specifically $LaMnO_3$ or $LaCoO_3$, or the solid solutions in which part of the La component in these materials is replaced with Sr, Ca and the like. Moreover, the fuel electrode material is generally a metal such as Ni or Co, or a cermet such as Ni—YSZ or Co—YSZ.

The solid oxide fuel cell is classified into the high temperature operation type operated at high temperatures around 1000° C. and the low temperature operation type operated at low temperatures around 700° C. A solid oxide fuel cell of the low temperature operation type uses an electric power generation cell which is improved to work as a fuel cell even at low temperatures by lowering the resistance of the electrolyte, for example, through making the electrolyte made of an yttria stabilized zirconia (YSZ) be a thin film of the order of 10 μm in thickness.

A solid oxide fuel cell operable at high temperature uses for the separator, for example, a ceramic having electronic conductivity such as lanthanum chromite ($LaCrO_3$), while a solid oxide fuel cell of low temperature operation type can use for the separator a metallic material such as stainless steel.

Additionally, as the structure of the solid oxide fuel cell, there have been proposed three types, namely, a cylindrical type, a monolithic type and a flat plate type.

The stack of a solid oxide fuel cell has a structure in which electric power generation cells, current collectors and separators are alternately laminated. A pair of separators sandwich an electric power generation cell from both sides of the cell in such a way that one of the separators is in contact with the air electrode through the intermediary of an air electrode current collector while the other separator is in contact with the fuel electrode through the intermediary of a fuel electrode current collector. For the fuel electrode current collector, a spongy porous substance made of a Ni based alloy or the like can be used, while also for the air electrode current collector, a spongy porous substance made of a Ag based alloy or the like can be used. A spongy porous substance simultaneously displays current collection function, gas permeation function, uniform gas diffusion function, cushion function, thermal expansion difference absorption function and the like, and is accordingly suitable for a multifunction current collector.

The separators electrically connect between the electric power generation cells, and also have a function to supply the gas to the electric power generation cells. Therefore, each separator has a fuel path through which the fuel gas is introduced from the peripheral side of the separator and is discharged from the separator surface facing the fuel electrode layer, and an oxidant path through which the oxidant gas is introduced from the peripheral side of the separator and is discharged from the separator surface facing the oxidant electrode layer.

In the case of the solid oxide fuel cell of low temperature operation type, metal (stainless steel or the like) plates of the order of 5 to 10 mm in thickness are used for the separators, and there has hitherto been known a separator having a structure such that gas discharge openings to discharge the fuel gas and the oxidant gas introduced from the peripheral side of the separator into the current collector are provided in the central part of the separator.

FIG. 8 is a sectional view of a relevant portion of a fuel cell stack illustrating an example of the above described separator. In FIG. 8, reference numeral 3 denotes a fuel electrode layer, reference numeral 6 denotes a fuel electrode current collector, reference numeral 8 denotes a separator, reference numeral 11 denotes a fuel path, reference numeral 25 denotes a gas discharge opening, and the arrows indicate the gas permeation condition.

Here, it should be noted that such a conventional separator structure as described above is associated with the following problems.

The structure is such that the fuel gas discharged from the central part of the separator 8 is supplied to the whole area of the fuel electrode layer 3 through the fuel electrode current collector 6 made of a porous cushioning material. However, in practice, there is a problem in that the fuel gas is consumed to a large extent by the electrode reaction in the neighborhood of the gas discharge opening 25, and hence the gas concentration is decreased with increasing distance away from the gas discharge opening 25. Consequently, the electrode reaction is not uniformly conducted over the whole area of the electrode, a temperature gradient is thereby generated in the electric power generation cell, the electric power generation cell is sometimes broken down by the thermal stress thus generated, and the resulting inefficient electric power generation leads to the degradation of the electric power generation properties (the electricity production comes to be large in the central part of the electric power generation cell and small in the peripheral part of the same cell). This problem has been particularly conspicuous in the fuel electrode section.

Additionally, the use of thick metallic plates of 5 to 10 mm in thickness makes the weight of a single cell itself heavy. Accordingly, in the case of a solid oxide fuel cell constructed by longitudinally arranging cell stacks, there is a problem such that the electric power generation cells in the cell stacks located in the bottom portion tend to be broken by the weight of the fuel cell. Consequently, as affairs stand, there remains a problem such that the cell configuration is inevitably constrained in such a way that the number of lamination layers is consistent with the tolerable weight of the fuel cell. Incidentally, in the case of a conventional structure, the weight of a cell stack weighs about 1 kg, and the total weight of a cell module made by laminating a large number of layers of this cell stack comes to be about 25 kg. Consequently, the structure supporting such a module is naturally complex.

As described above, in a conventional solid oxide fuel cell, each of the current collectors made of a porous cushioning material is arranged between an electrode layer and a separator, and the gas is distributed to be supplied to each of the electrode layers through the current collectors. However, there has been a problem such that in the conventional structure, the retaining time of the gas in a current collector is short. Consequently, the fuel gas not engaging with the electrode reaction is discharged outside the electric power generation cell, so that the electric power generation efficiency is thereby degraded.

Additionally, in the conventional structure, the linear velocity of the gas in the peripheral part of the electric power generation cell comes to be slow. Consequently, there has also been a problem such that from the peripheral part of the electric power generation cell, air as an oxidant is taken into the interior of the electric power generation cell, where the combustion reaction tends to take place, the combustion reaction completely consumes the fuel gas to be usable for the electrode reaction, and consequently the electric power generation efficiency is degraded.

Such an adverse phenomenon has remarkably taken place particularly in a fuel cell stack provided with the separators having a structure in which the fuel gas or the oxidant gas is supplied to the fuel cell electrode current collector or the oxidant electrode current collector from the central part of each separator.

SUMMARY OF THE INVENTION

In view of the above described problems, a first object of the present invention is the provision of a planar solid oxide fuel cell in which the electric power generation efficiency is improved by making uniform the electrode reaction in the current collectors, and adverse effects such as breakdown accidents are prevented by making the separators light in weight, and the provision of the separator for use in the solid oxide fuel cell.

More specifically, the present invention is a planar solid oxide fuel cell in which a fuel electrode layer and an oxidant electrode layer are arranged on both surfaces of a solid electrolyte layer, respectively. A fuel electrode current collector and an oxidant electrode current collector are arranged outside the fuel electrode layer and the oxidant electrode layer, respectively. Respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively. The fuel cell is characterized in that each of the separators includes a first gas discharge opening for discharging the introduced gas from the central part of the separator and a plurality of second gas discharge openings for discharging the introduced gas along the peripheral part of the separator in a circular manner.

In the configuration described above, the gas is discharged from the central part of each separator and is discharged in a circular manner from the peripheral part of each separator. Accordingly, the gas can be sufficiently supplied to and distributed over the whole areas of the current collectors. Consequently, the electrode reactions are made to be performed uniformly all over all of the areas of the electrodes. Thus, an efficient electric power generation can be carried out in which the difference in electricity production between the central parts and the peripheral parts is eliminated.

Additionally, the present invention is characterized in that in the planar solid oxide fuel cell, the each separator is made up by laminating a plurality of thin metal plates at least including a thin metal plate provided with the first gas discharge opening and the second gas discharge openings and a thin metal plate with a worked indented surface.

According to the above described configuration, the separators themselves can be made light in weight, the concavities and convexities of the thin metal plates form the gas flow paths and hence the introduced gas is diffused uniformly over the whole areas of the separators, so that ensured is the gas supply to the first gas discharge openings as a matter of course and also to the second gas discharge openings formed in the peripheral parts in a circular manner.

Additionally, the present invention is a planar solid oxide fuel cell, characterized in that the thin metal plate provided with the first gas discharge opening and the second gas discharge opening is arranged at least on the side of each of the fuel electrode current collectors.

The nonuniformity of the electrode reaction in the current collectors is conspicuous around the portions where the supplied gas enters. This is due to the fact that in contrast to air (the oxidant gas), the fuel gas cannot be supplied in a large amount, so that the supply amount is restricted. Accordingly, in the present configuration, such gas discharge structure as described above is applied at least to the separator portions in contact with the fuel electrode current collectors, so that the nonuniformity of the electrode reaction in the fuel electrode layers is reduced.

Additionally, the present invention is a separator for use in a solid oxide fuel cell which is contacted with each current collector arranged outside each electrode to form a gas passage for supplying a gas to the electrode. The separator includes a first gas discharge opening for discharging an introduced gas from the central part thereof and a plurality of second gas discharge openings for discharging the gas along the peripheral part thereof in a circular manner.

Additionally, the present invention is the separator for use in a solid oxide fuel cell, characterized in that the separator is made up by laminating a plurality of thin metal plates including at least the thin metal plate provided with the first gas discharge opening and the second gas discharge opening and a thin metal plate having a worked indented surface.

Additionally, the present invention is the separator for use in a solid oxide fuel cell, characterized in that the thin metal plate provided with the first gas discharge opening and the second gas discharge opening is arranged at least on the side of the fuel electrode current collector.

Furthermore, in view of the above described problems involved in the conventional techniques, another object of the present invention is the provision of a solid oxide fuel cell in which the electric power generation efficiency is improved by increasing the utilization ratios of the fuel gas and the oxidant gas in the current collectors, and the provision of the separator for use in the solid oxide fuel cell.

More specifically, the invention is a solid oxide fuel cell in which a fuel electrode layer and an oxidant electrode layer are arranged on both surfaces of a solid electrolyte layer, respectively. A fuel electrode current collector and an oxidant electrode current collector, both collectors being formed of a porous substance, are arranged outside the fuel electrode layer and the oxidant electrode layer, respectively. Respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively. The fuel cell is characterized in that indents are formed on the surface of each of the separators, which surface is in contact with each of the current collectors, to increase the dwell volume of the gas in the current collectors.

In the above described configuration, the current collectors made of a spongy porous substance each are expanded in conformity with the depression of the associated separator. Hence, the volumes of the separators are increased, so that the retaining time of the gas is elongated (the gas permeation rate is made slower) if the supplied amount of the gas is constant. In this way, the reaction between the gases and the electrode layers comes to be conducted satisfactorily, and the electric power generation efficiency is thereby improved.

Additionally, the invention is a solid oxide fuel cell in which a fuel electrode layer and an oxidant electrode layer are arranged on both surfaces of a solid electrolyte layer, respectively. A fuel electrode current collector and an oxidant electrode current collector, both collectors being formed of a porous substance, are arranged outside the fuel electrode layer and the oxidant electrode layer, respectively. Respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively. The fuel cell is characterized in that the peripheral part of the surface of each of the separators, which surface is in contact with each of the current collectors, is protruded expandably to increase the linear velocities of the gases in the peripheral parts of the current collectors.

The increase of the linear velocity of the gas being discharged in the peripheral parts prevents the air entrained from the peripheral parts, and in particular, in the peripheral parts of the fuel electrode layers, can maintain the fuel gas concentration in an elevated concentration condition, and the electric power generation performance is thereby improved.

Additionally, the invention is a solid oxide fuel cell in which a fuel electrode layer and an oxidant electrode layer are arranged on both surfaces of a solid electrolyte layer, respectively. A fuel electrode current collector and an oxidant electrode current collector, both collectors being formed of a porous substance, are arranged outside the fuel electrode layer and the oxidant electrode layer, respectively. Respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively. The fuel cell is characterized in that indents are provided on the surface of each of the separators, which surface is in contact with each of the current collectors, and the peripheral part of the separator is protruded expandably.

In the above described configuration, the gas permeation rate in the interior of the current collectors is made slow and the electrode reactions are made satisfactory, and the linear velocity of the gas in the peripheral parts is made fast, and the entraining of the air from the peripheral parts can thereby be prevented. Consequently, the electric power generation performance can be improved.

Additionally, the present invention is the solid oxide fuel cell, characterized in that the surface shape of the separators is formed at least on the surfaces in contact with the current collectors.

The phenomenon of the incomplete reaction of the gas in the interior of the current collectors takes place on the portions where the supplied fuel gas enters. This is due to the fact that in contrast to air (the oxidant gas), the fuel gas cannot be supplied in large amount, so that the supply amount is restricted. Accordingly, in the present configuration, the depressions and the protruded portions are provided at least on the surface, in contact with one of the fuel electrode current collectors, of each of the separators. The phenomenon of the incomplete reaction of the gas and the phenomenon of the entraining of the air in the fuel electrode current collector are thereby remedied.

Additionally, the invention is the solid oxide fuel cell, characterized in that the fuel cell includes a structure in which the fuel gas and the oxidant gas are supplied from the central parts of the separators, respectively, to the fuel electrode layer and the oxidant electrode layer, respectively, through the fuel electrode current collector and the oxidant electrode current collector, respectively.

Additionally, the invention is a separator for use in a solid oxide fuel cell which is in contact with one of the current collectors arranged outside the respective electrodes to form a gas passage for supplying a gas to one of the electrode sections. Indents are provided on the surface of the separator, which surface is in contact with one of the current collectors, to increase the dwell volume of the gas in the current collectors.

Additionally, the invention is a separator for use in a solid oxide fuel cell which is contacted with each current collector arranged outside each electrode to form a gas passage for supplying a gas to each electrode section. The peripheral part of the surface of the separator, which surface is in contact with the current collector, is protruded expandably to increase the linear velocity of the gas in the peripheral part of the current collector.

Additionally, the invention is a separator for use in a solid oxide fuel cell which is contacted with each current collector arranged outside each electrode to form a gas passage for supplying a gas to each electrode section. Indents are provided on the surface of the separator, which surface is in contact with the current collector, and the peripheral part of the surface concerned is protruded expandably.

Additionally, the invention is the separator, characterized in that the surface shape of the separator is formed at least on the surface in contact with one of the fuel electrode current collectors.

BRIEF DESCRIPTION OF THE DRAWINGS

FIG. 2a being a related plan view and FIG. 2b being a related sectional view;

DETAILED DESCRIPTION OF THE INVENTION

Description will be made below on the embodiments of the present invention with reference to the accompanying drawings. Incidentally, in the following description, for the simplification of description, the same reference symbols are used for the portions common to the conventional portions.

First Embodiment

Description will be made below of the first embodiment of the present invention with reference to FIG. 1, FIG. 2 to FIG. 2b, and FIG. 3; in the first place, on the basis of FIG. 1, description will be made on the configuration of a solid oxide fuel cell involved in the present embodiment.

Figure 1:
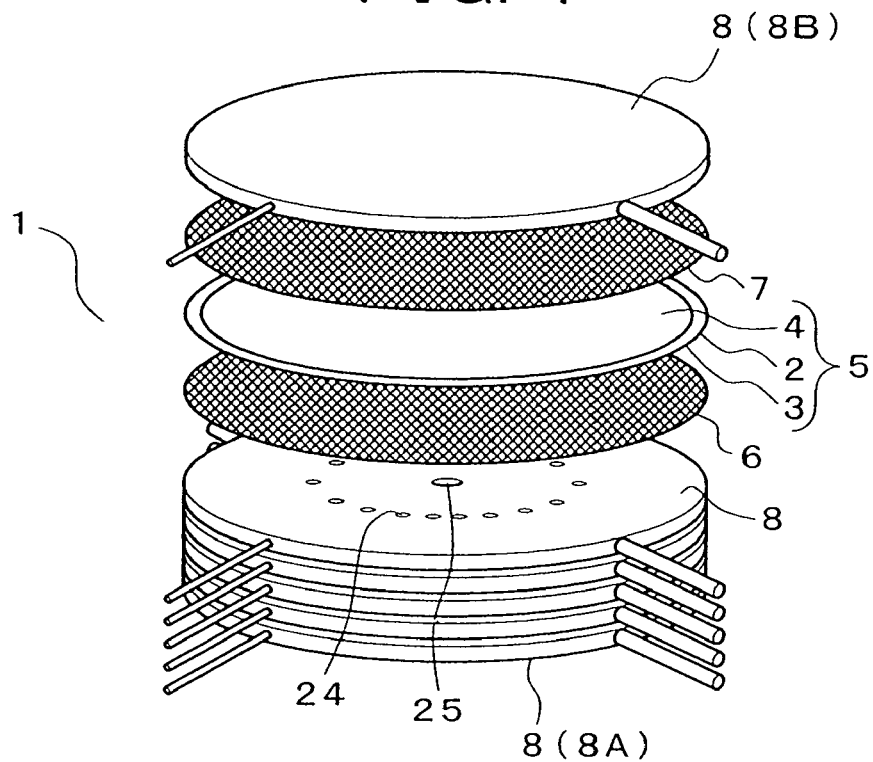
FIG. 1 is an exploded oblique perspective view illustrating the configuration of a relevant portion of a planar solid oxide fuel cell involved in the present invention.

In FIG. 1, reference numeral 1 denotes a fuel cell stack, which has a structure in which an electric power generation cell 5 in which a fuel electrode layer 3 and an air electrode layer (oxidant electrode layer) 4 are arranged respectively on both surfaces of a solid electrolyte layer 2, a fuel electrode current collector 6 arranged outside the fuel electrode layer 3, an air electrode current collector (oxidant electrode current collector) 7 arranged outside the air electrode layer 4, and separators 8 arranged respectively outside the current collectors 6 and 7 are laminated in this order. The present embodiment is suitably applicable to a sealless structure in which no gas seal is present along the rim of a fuel electrode current collector.

Here, the solid electrolyte layer 2 is formed of a stabilized zirconia (YSZ) that has added yttria and the like, the fuel electrode layer 3 is formed of a metal such as Ni or Co, or a cermet such as Ni—YSZ or Co—YSZ, the air electrode layer 4 is formed of $LaMnO_3$, $LaCoO_3$ or the like, the fuel electrode current collector 6 is formed of a spongy porous sintered metal plate made of a Ni based alloy or the like, and the air electrode current collector 7 is formed of a spongy porous sintered metal plate made of a Ag based alloy or the like.

The separators 8 have a function to connect electrically between the electric power generation cells 5 similarly to the conventional separators, and also have a function to supply a gas to the electric power generation cells 5. However, the structure of the separators is different from the structure of the conventional separators shown in FIG. 8.

Figure 2A:
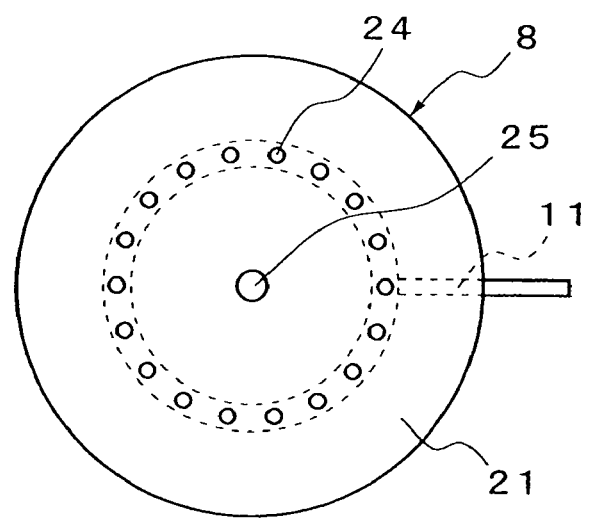
FIG. 2a and FIG. 2b illustrate the structure of a separator on the side of a fuel electrode involved in the present invention.
Figure 2B:
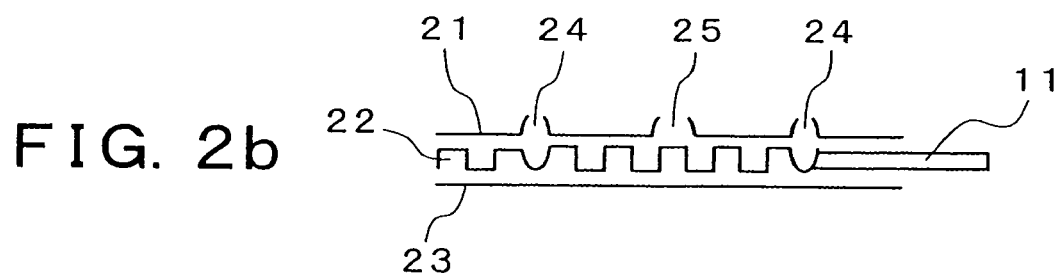

More specifically, the conventional separator is fabricated of a thick, single metal plate, whereas as shown in FIG. 2a and FIG. 2b, the separator 8 of the present embodiment has a three layer structure which is formed by successively laminating a metal upper plate 21 provided with a plurality of gas discharge openings, an intermediate plate 22 processed to have a surface with alternate convexities and concavities, and a flat lower plate 23. For all these plates, thin metal plates made of stainless steel or the like are used.

In the upper plate 21, a first fuel gas discharge opening 25 is formed in the central part thereof, and a plurality of second fuel gas discharge openings 24 are formed in a circularly aligned manner. The fuel gas introduced from the rim face of the separator 8 is discharged, through a fuel gas passage 11, from these gas discharge openings 24 and 25, and supplied to the fuel electrode current collector 6 facing the separator 8.

For the intermediate plate 22, there is used a sheet metal material processed so as to have a surface with alternate convexities and concavities for the purpose of ensuring the strength and the thickness as a separator. This plate is combined with the upper plate 21 and the lower plate 23 to form a hollow separator 8 as shown in FIG. 2b. The hollow portions formed by these convexities and concavities function as the gas flow path making the fuel gas diffuse easily, and simultaneously the weight saving of the separator 8 can be actualized.

Incidentally, the worked indented surface can be formed by applying the plastic working to this sheet metal. In contrast to the rectangular shape shown in the figure, a corrugated shape (corrugated plate) may also be used. Additionally, a plate material provided with worked indented surface patterns by applying the embossing processing may also be used.

The lower plate 23 forms a partition wall between the fuel electrode section and the air electrode section. The above described combination of the upper plate 21 and the intermediate plate 23 constitutes a separator structure on the fuel electrode side. In practice, the separator portion on the air electrode side is formed with the intervening lower plate 23, but in the figure concerned, the relevant portion is omitted.

Incidentally, the separators 8 (8A, 8B) at both ends of the fuel cell stack 1 shown in FIG. 1 have respectively either one of the above described separator structures on the fuel electrode side and the air electrode side.

In the above described configuration of the planar solid oxide fuel cell, the fuel gas discharged from the central part and the peripheral part of the separator 8 can be spread over the whole area of the fuel electrode layer 3 with a satisfactory distribution through the fuel electrode current collector 6. Accordingly, the gas reaction can be carried out efficiently over the whole area of the electrode layer.

Figure 3:
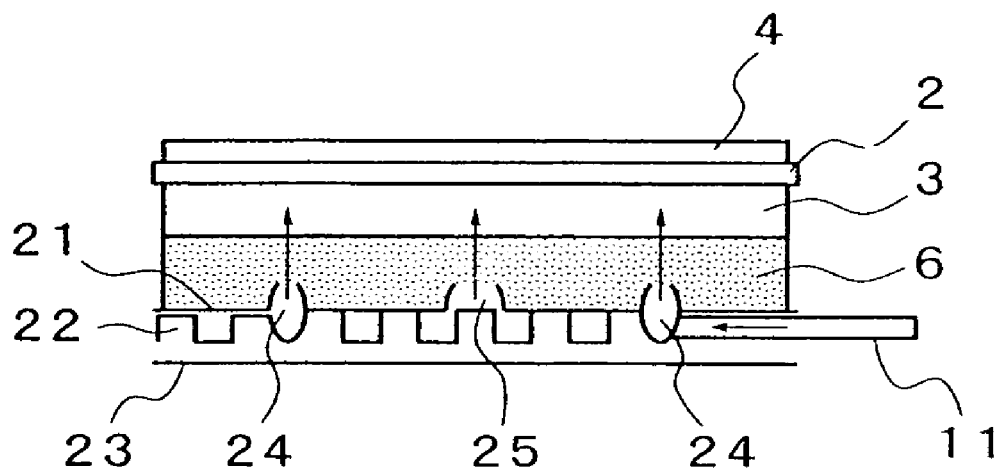
FIG. 3 is a sectional view of a relevant portion of a fuel cell stack involved in the present invention.
Figure 8:
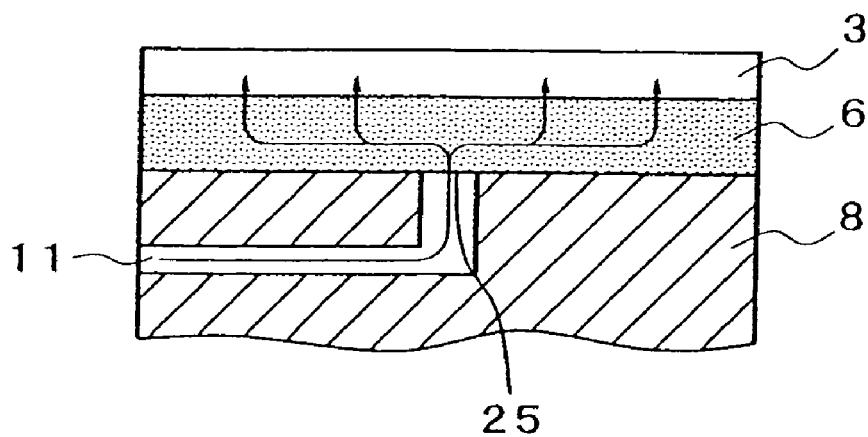
FIG. 8 is a sectional view of a relevant portion of a conventional fuel cell stack.

More specifically, a conventional type separator, provided with the gas discharge opening 25 merely in the central part of the separator 8 shown in FIG. 8, has a structure such that the gas can hardly be spread to the peripheral part. Accordingly, the electrode reaction is not spatially uniform, so that there have been problems including the breakdown of the electric power generation cell and the degradation of the electric power generation efficiency due to the thermal stress. However, according to the separator structure of the present embodiment, as shown in FIG. 3, the fuel gas introduced from the peripheral face of the separator through the fuel path 11 is made to diffuse over the whole area of the separator by taking advantage of the hollow portions (convexities and concavities) of the separator 8 as the gas passage, the fuel gas is discharged from the first fuel gas discharge opening 25 in the central part and a plurality of second fuel gas discharge openings 24 in the peripheral part, and the fuel gas can be spread over the whole area of the fuel electrode layer 3 with a satisfactory distribution through the fuel electrode current collector 6 facing the separator. Consequently, the electrode reaction comes to be carried out uniformly over the whole electrode areas. Hence, the electric power generation can be carried out efficiently with a vanishing difference in electricity production between the central part and the peripheral part.

Moreover, the separator 8 of the present embodiment is made to have a laminate structure with a hollow interior. Hence, the weight of the separator itself can be drastically reduced as compared to the conventional type separator. Such a structure is extremely effective in a fuel cell module having a structure in which a large number of cell stacks are longitudinally laminated, in view of the fact that the burden loaded on the electric power generation cells located in the lower positions is reduced. Consequently, the supporting frame for the fuel cell module can be simplified, and the constraint imposed on the number of lamination layers in the cell stack can be alleviated. Thus, an electric power generation of high electromotive force can be actualized.

As described above, as for the present embodiment, description has been made on the structure of the separator part in contact with the fuel electrode current collector 6, and a similar structure can be applied to the separator part in contact with the air electrode current collector 7. Additionally, some simple discharge structure other than those described above (for example, as shown in FIG. 7, a gas discharge structure restricted to the central part) can be adopted. The nonuniformity of the electrode reaction in the interior of the current collectors is conspicuous around the portions where the supplied fuel gas enters. Accordingly, it is important to apply the structure of the present embodiment at least to the separator part facing the fuel electrode current collector 6.

Additionally, in the present embodiment, the separator 8 has a three layer structure formed of three thin metal plates. However, the separator structure is not restricted to this structure, and may take a two layer structure in which the lower plate 23 is omitted. In this way, a further weight savings of the separator 8 can be expected.

Additionally, in the present embodiment, there is presented a solid oxide fuel cell in which a stabilized zirconia (YSZ) that has added yttria is used for the electrolyte in the electric power generation cell. However, the present invention can be applied to other solid oxide fuel cells such as those solid oxide fuel cells in which a ceria based electrolyte and a gallate based electrolyte are used.

Second Embodiment

Figure 4:
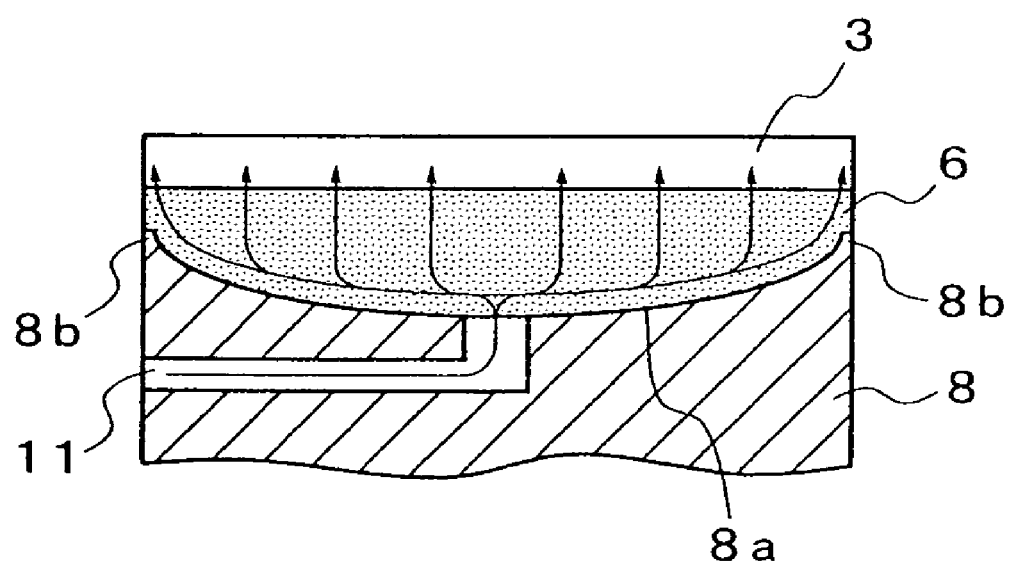
FIG. 4 is a sectional view of a relevant portion of a fuel cell stack illustrating the shape of the separator according to a second embodiment of the present invention.

Now, description will be made below of the second embodiment of the present invention. FIG. 4 shows a sectional view of a relevant portion of a fuel cell stack illustrating the shape of the separator, FIG. 5a to FIG. 5d show the sectional views of the relevant portions illustrating the other examples of separators, FIG. 6 shows an exploded sectional view of a solid oxide fuel cell, and FIG. 7 shows an exploded oblique perspective view of the relevant portion of the same solid oxide fuel cell in the present embodiment.

In the first place, on the basis of FIG. 6 and FIG. 7, description will be made below of the configuration of the solid oxide fuel cell involved in the present embodiment.

Figure 6:
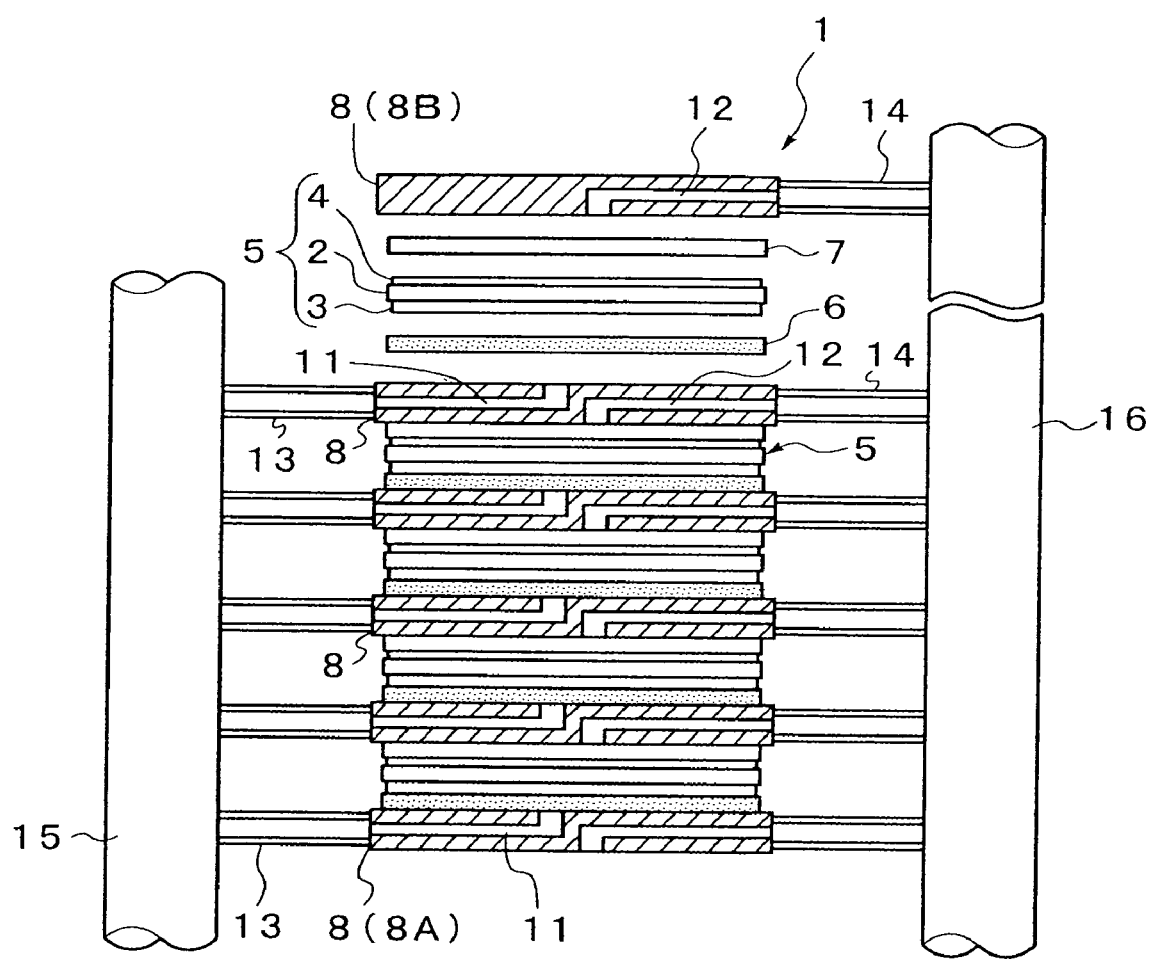
FIG. 6 is an exploded sectional view of a solid oxide fuel cell.
Figure 7:
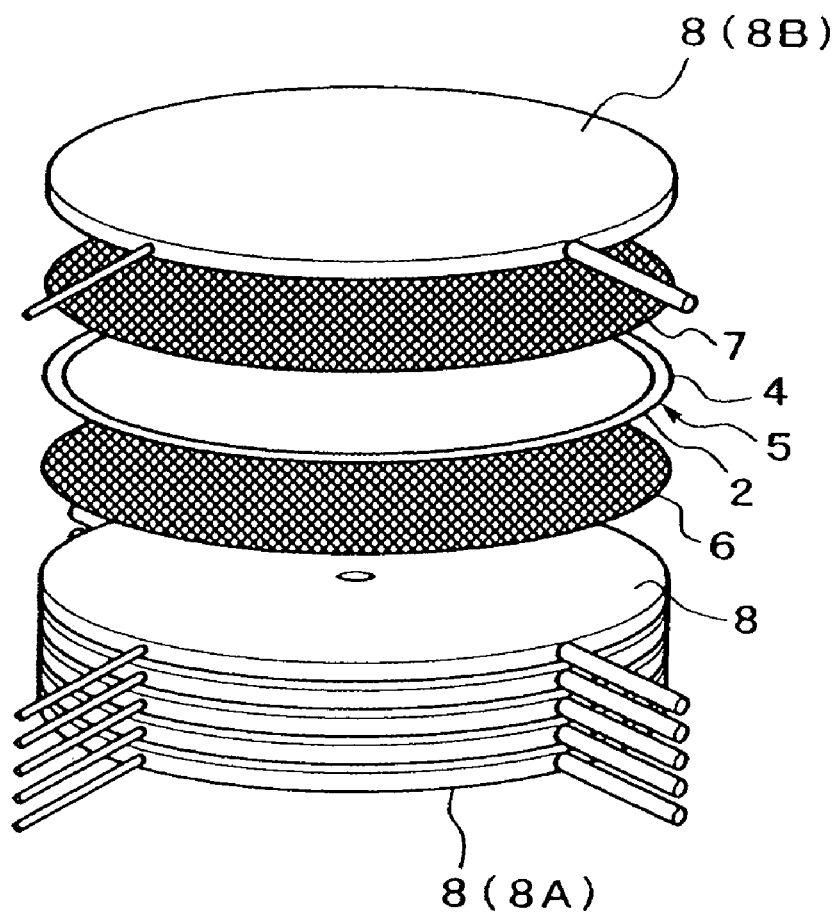
FIG. 7 is an exploded perspective view of a relevant portion of the solid oxide fuel cell.

In FIG. 6, reference numeral 1 denotes a fuel cell stack, which has a structure in which an electric power generation cell 5 in which a fuel electrode layer 3 and an air electrode layer (oxidant electrode layer) 4 are arranged respectively on both surfaces of a solid electrolyte layer 2, a fuel electrode current collector 6 arranged outside the fuel electrode layer 3, an air electrode current collector (oxidant electrode current collector) 7 arranged outside the air electrode layer 4, and separators 8 arranged respectively outside the current collectors 6 and 7 are laminated in this order.

The solid electrolyte layer 2 is formed of a stabilized zirconia (YSZ) that has added yttria and the like, the fuel electrode layer 3 is formed of a metal such as Ni or Co, or a cermet such as Ni—YSZ or Co—YSZ, the air electrode layer 4 is formed of $LaMnO_3$, $LaCoO_3$ or the like, the fuel electrode current collector 6 is formed of a spongy porous sintered metal plate made of a Ni based alloy or the like, the air electrode current collector 7 is formed of a spongy porous sintered metal plate made of a Ag based alloy or the like, and the separators 8 are formed of a stainless steel or the like.

Here, the porous metal plates forming the current collectors 6 and 7 are the plates having been fabricated through the following steps. The order of the steps is as follows: a step for preparing a slurry→a step for molding→a step for foaming→a step for drying→a step for degreasing→a step for sintering.

In the first place, in the step for preparing a slurry, a metal powder, an organic solvent (n-hexane or the like), a surfactant (sodium dodecylbenzenesulfonate or the like), a water soluble resin binder (hydroxypropylmethyl cellulose or the like), a plasticizer (glycerin or the like) and water are mixed together, and thus a foaming slurry is prepared. In the step for molding, by means of the doctor blade method, the slurry is molded in a thin plate shape on a carrier sheet, and thus a green sheet is obtained. Then, in the step for foaming, this green sheet is foamed into a spongy condition in a high temperature and high humidity environment with the aid of the vapor pressure of the volatile organic solvent and the foaming property of the surfactant. Subsequently, a porous metal plate is obtained through the step for drying, the step for degreasing and the step for sintering.

In this case, in the step for foaming, the bubbles generated in the interior of the green sheet grow with nearly spherical shapes as a result of receiving nearly equivalent pressures along all the directions. When a bubble diffuses to approach the interface to the atmosphere, the bubble grows toward the thin part of the slurry interposed between the bubble and the atmosphere, and eventually the bubble is broken and the gas inside the bubble diffuses into the atmosphere through the formed small holes. Accordingly, there is obtained a porous metal plate provided with continuous pores having openings on the surface. The current collectors 6 and 7 each are formed by cutting a thus fabricated porous metal plate having a three dimensional skeleton structure into a circular form.

On the other hand, as shown in FIG. 6 and FIG. 7, the separators 8 electrically connect between the electric power generation cells 5, and also have a function to supply the gas to the electric power generation cells 5. Therefore, each separator has a fuel path 11 through which the fuel gas is introduced from the peripheral side of the separator 8 and is discharged from the approximately central part of the surface of the separator 8 facing the fuel electrode current collector 6, and an oxidant path 12 through which the oxidant gas is introduced from the peripheral side of the separator 8 and is discharged from the separator surface facing the air electrode current collector 7. Here, it should be noted that the separators 8 (8A, 8B) at both ends of the stack each have either one of the paths 11 and 12.

Additionally, the separator 8 of the present embodiment is different from a flat shaped conventional type shown in FIG. 8. In particular, the surface of the separator 8 in contact with the fuel electrode current collector 6 is made to be bowl shaped, as shown in FIG. 4, by providing a depression indent 8a forming a deepened central part. Consequently, the situation is such that the peripheral part 8b is raised relative to the central part. In other words, the peripheral part protrudes in an axial direction farther than the central part. As has already been described, the material for the fuel electrode current collector 6 itself is formed of a spongy foam. Hence, at the time of lamination, the foam is arranged in a condition such that the foam is in close contact with the depression shape of the separator 8. Therefore, as far as the separator 8 shown in FIG. 4 is used, the fuel electrode current collector 6 is made to have a shape in which the central part of the collector is swollen (thicker) as compared to a conventional collector (for example, if the thickness of a conventional fuel electrode current collector 6 is about 0.75 mm, the maximum thickness of the central part is made to increase to the order of about 1.5 mm in the case of the present embodiment). Moreover, the peripheral part is made to be thinner as compared to the conventional type (for example, made to be of the order of 0.2 mm in relation to the thickness of 0.75 mm of the conventional type).

Additionally, as shown in FIG. 6, respectively on both sides of the fuel cell stack 1, a fuel supply manifold 15 for fuel for supplying fuel gas through connecting pipes 13 to fuel paths 11 in the respective separators 8 and an oxidant gas supply manifold 16 for supplying oxidant gas through connecting pipes 14 to oxidant paths 12 in the respective separators 8 are arranged along the direction of the lamination of the electric power generation cells 5 in an extended manner.

According to the above described configuration of the fuel cell, the fuel gas discharged from the central part of the separators 8 is spread over the whole area of the fuel electrode layer 3 through the fuel electrode current collector 6 with a satisfactory distribution, and thus a satisfactory gas reaction can be carried out over the whole area of the electrode layer. More specifically, as shown in FIG. 8, in a conventional type device having flat separators 8, the fuel electrode current collectors 6 are also flat shaped, and in particular, the permeation rate of the fuel gas (the arrows in the figure) is fast in the neighborhood of the central part of each of the fuel electrode current collectors 6 (in other words, the retaining time of the gas in the current collector is short). Thus, the electrode reaction in the neighborhood of the central part of the electrode layer is not completely carried out. Moreover, the situation is such that the gas is not sufficiently spread to the peripheral part, so that the nonuniformity of the electrode reaction is caused, and there is a possibility such that most of the fuel gas not engaged in the reaction is vainly discharged outside the electric power generation cell. On the contrary, the use of the separators 8 shown in FIG. 4 increases the volume of the fuel electrode current collectors 6 themselves, so that if the supplied amount of the gas from the separators 8 is constant, the permeation rate of the gas is thereby made slower and the retaining time of the gas in the current collectors can be made longer. Consequently, the gas discharged from the central part of each of the separators 8 can be made to permeate the wide area from the central part to the peripheral part of the fuel electrode current collector 6. The fuel gas can thereby be supplied to the fuel electrode layer 3 in a uniformly distributed manner, so that a satisfactory gas reaction can be carried out over the whole area of the electrode layer.

Additionally, in each of the separators 8 of the present embodiment, the peripheral part is protruded expandably, and the thickness of the peripheral part of the fuel electrode current collector 6 thereby comes to be thinner than the thickness of the conventional current collector. Therefore, particularly in the case of a sealless structure (a type in which the rim of the fuel electrode current collector has no gas seal), the linear velocity of the gas being discharged is increased in the peripheral part of the fuel electrode current collector, and the entraining of the air from the peripheral part is thereby prevented and the combustion reaction in the interior of the electric power generation cell can be inhibited. Therefore, also in the peripheral part of the fuel electrode layer 3, there can be maintained a condition in which the fuel gas concentration is raised, and the improvement of the electric power generation performance can thereby be expected.

Figure 5A:
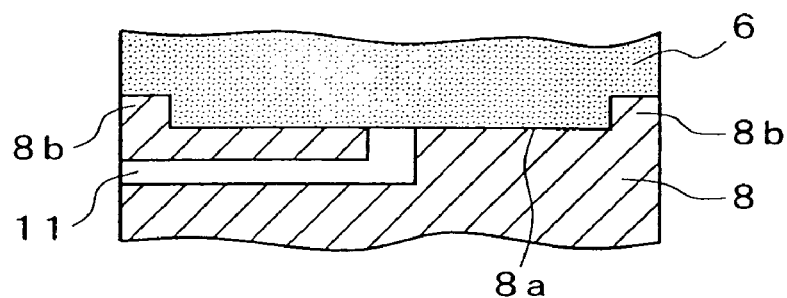
FIG. 5a to FIG. 5d are sectional views illustrating the shapes of separators different from the shape shown in FIG. 1.
Figure 5B:
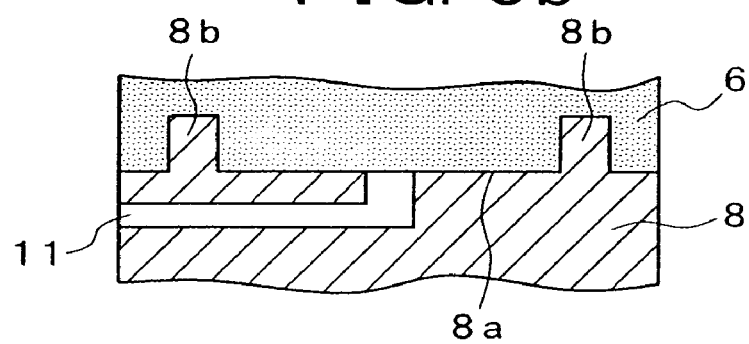
Figure 5C:
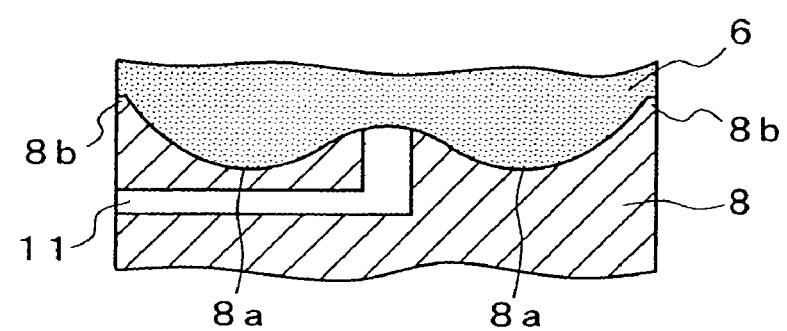
Figure 5D:
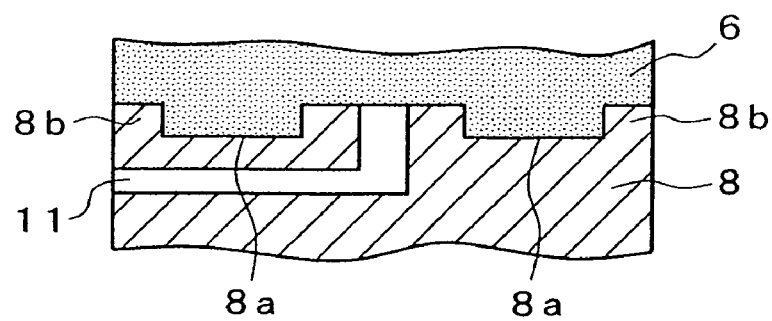

As described above, as for the present embodiment, description has been made of the shape of the surface, in contact with fuel electrode current collector 6, of the separator 8. The shape of the surface, in contact with the air electrode current collector 7, of the separator 8 can be made to have a similar shape. Additionally, the shape of the surface of the separator 8 is not limited to the shape shown in FIG. 4, and various shapes as shown in FIG. 5a to FIG. 5d are conceivable. In these figures, reference numeral, 8a denotes a depression (indent) located in the central part or in the neighborhood thereof similarly to the case described above, reference numeral 8b denotes the peripheral part raised along the periphery of the depression 8a. As illustrated in FIGS. 5c and 5d, multiple depression (indents) 8a may be formed in the surface, with the raised peripheral portion 8b around the periphery. To sum up, acceptable is a shape in which the volume of the current collector can be made larger, and thickness of the peripheral part can be made thin.

Additionally, as the porous structure of the current collectors 6 and 7, mesh, felt and the like can be used in addition to foam.

Additionally, in the present embodiment, there is presented a solid oxide fuel cell in which a stabilized zirconia (YSZ) that has added yttria is used for the electrolyte in the electric power generation cell. However, the present invention can be applied to other solid oxide fuel cells such as those solid oxide fuel cells in which a ceria based electrolyte and a gallate based electrolyte are used.

INDUSTRIAL APPLICABILITY

Effect of the First Embodiment

As described above, according to the present invention, gas discharge openings are provided in the central part and the peripheral part of a separator, so that the gas can be sufficiently spread over the whole area of a current collector. Consequently, the electrode reaction can be carried out uniformly over the whole area of the electrode, and thus an efficient electric power generation can be carried out in which the difference in electricity production between the central part and the peripheral part of the electric power generation cell is eliminated.

Additionally, according to the present invention, the separators are made up by laminating a plurality of thin metal plates including at least the thin metal plates each provided with a first gas discharge opening and second gas discharge openings and thin metal plates having a worked indented surface. Consequently, the separators themselves are made light in weight, and the number of lamination layers of a cell stack in a longitudinal type fuel cell module can thereby be increased, so that an electric power generation of high electromotive force can be actualized. Additionally, the convexities and concavities form the gas flow path. Hence, the introduced gas comes to be easily supplied to the whole area of the current collector, so that an efficient electric power generation can be actualized in which the nonuniformity of the electrode reaction in the interior of the current collector is reduced.

Additionally, according to the present invention, the above described separator structure is applied at least to the separator part on the side of the fuel electrode current collector, so that the nonuniformity phenomenon of the electrode reaction in the interior of the fuel electrode current collector, which is conspicuous around the portions where the supplied gas enters, can be effectively improved, and consequently an efficient electric power generation can be actualized in which the fuel utilization ratio is high.

Effect of the Second Embodiment

Additionally, according to the invention, indents are provided on the surface, in contact with one of the current collectors, of each of the separators. Accordingly, the dwell volume of the gas in the interior of the current collectors is increased, and hence the retaining time of the gas is thereby made longer (the gas permeation rate is made slower). Consequently, the gas is slowly spread over a wide area through the current collector, a satisfactory gas reaction comes to be carried out over the whole area of the electrode layer. Accordingly, the fuel utilization ratio and the air utilization ratio are increased, and the electricity generation performance is improved.

Additionally, according to the invention, the peripheral part of the surface, in contact with the current collector, of the separator is protruded expandably. Accordingly, the linear velocity of the gas being discharged is raised in the peripheral part, the entraining of the air from the peripheral part is prevented, and the combustion reaction in the interior of the electric power generation cell can be inhibited. Consequently, in the peripheral part of the fuel electrode layer, there can be formed a condition in which the fuel gas concentration is raised, and the electric power generation performance is thereby improved.

Additionally, according to the invention, indents are provided on the surface, in contact with the current collector, of the separator, and the peripheral part of the separator is protruded in an expanded manner. Therefore, the effects are obtained in which the permeation rate of the gas in the interior of the current collector is made slower and the electrode reaction is made satisfactory. Moreover, the linear velocity of the gas being discharged in the peripheral part is made fast, and the entraining of the air from the peripheral part can be prevented.

Additionally, according to the invention, the above described surface shape of the separator is made to be formed at least on the surface thereof in contact with the fuel electrode current collector, so that the phenomena of the incomplete reaction of the gas and the entraining of the air in the fuel electrode current collector are improved without failure. Hence, the electric power generation performance is improved.

Additionally, according to the invention, the structure is such that the gases are supplied respectively from the central parts of the separators, respectively to the fuel electrode layer and the oxidant electrode layer, respectively through the fuel electrode current collector and the oxidant electrode current collector. Therefore, the gases slowly permeate over the wide areas from the central parts of the current collectors to the peripheral parts, and are supplied to the electrode layers in a uniformly distributed manner, and satisfactory electrode reactions come to be carried out over the whole areas of the electrode layers.

The invention claimed is:

1. A separator of an oxide fuel cell, the fuel cell including an electrode layer on a surface of a solid electrolyte layer, and including a current collector positioned outside the electrode layer, the current collector being arranged to be supplied with a gas by said separator, said separator comprising:
a central part; and
a peripheral part surrounding an entirety of said central part;
wherein a surface of said separator for contacting the current collector has an indent in said central part of said separator such that an entirety of said central part of said separator is thinner than said peripheral part of said separator, whereby a corresponding central part of the current collector contacted by said separator fills said indent such that an entirety of the corresponding central part of the current collector is thicker than a peripheral portion of the current collector.

2. The separator of claim 1, wherein said indent in said surface of said separator comprises one of a plurality of indents, all of said indents being located in said central part such that said entirety of said central part of said separator is thinner than said peripheral part of said separator.

3. The separator of claim 1, wherein said surface has only one indent in said central part of said separator such that said entirety of said central part of said separator is thinner than said peripheral part of said separator.

4. The separator of claim 1, wherein said peripheral part extends along an outer periphery of said separator.

5. A separator of an oxide fuel cell, the fuel cell including an electrode layer on a surface of a solid electrolyte layer, and including a current collector positioned outside the electrode layer, the current collector being arranged to be supplied with a gas by said separator, said separator comprising:
a surface for contacting the current collector, an entire peripheral part of said surface protruding in an axial direction farther than a central part of said surface, said peripheral part surrounding said entirety of said central part.

6. The separator of claim 5, wherein said surface has an indent in said central part of said surface.

7. The separator of claim 6, wherein said surface has only one indent in said central part of said surface.

8. The separator of claim 5, wherein said surface has a plurality of indents in said central part of said surface.

9. The separator of claim 5, wherein said peripheral part of said surface extends along an outer periphery of said separator.

10. The separator of claim 5, wherein said entire peripheral part of said surface protrudes in an axial direction farther than an entirety of said central part of said surface.

* * * * *